US007481119B2

(12) United States Patent
Yang et al.

(10) Patent No.: US 7,481,119 B2
(45) Date of Patent: Jan. 27, 2009

(54) MICRO-FLUIDIC OSCILLATOR HAVING A SUDDEN EXPANSION REGION AT THE NOZZLE OUTLET

(75) Inventors: Jung-Tang Yang, Hsinchu (TW); Chi-Ko Chen, Bade (TW); Kun-Chih Tsai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 66 days.

(21) Appl. No.: 11/603,030

(22) Filed: Nov. 22, 2006

(65) Prior Publication Data

US 2008/0115849 A1 May 22, 2008

(51) Int. Cl.
*G01F 1/20* (2006.01)

(52) U.S. Cl. ..................................................... 73/861.19

(58) Field of Classification Search ............... 73/861.19
See application file for complete search history.

(56) References Cited

U.S. PATENT DOCUMENTS 3,902,367 A 9/1975 Grant et al.
4,610,162 A * 9/1986 Okabayashi et al. ...... 73/861.19
5,165,438 A * 11/1992 Facteau et al. ................. 137/1
6,860,157 B1 * 3/2005 Yang et al. ............... 73/861.19
6,976,507 B1 * 12/2005 Webb et al. ................. 137/826
2005/0214147 A1 * 9/2005 Schultz et al. ............. 417/503

* cited by examiner

*Primary Examiner*—Harshad Patel
(74) *Attorney, Agent, or Firm*—Rosenberg, Klein & Lee

(57) ABSTRACT

A micro-fluidic oscillator comprises a main body and a cover body for covering the main body. An oscillation chamber is disposed on the main body to provide an oscillation space for fluid. A sudden-expansion micro-nozzle is connected with one end of the oscillation chamber, and an outlet passage is connected with the other end of the oscillation chamber. Two fluid-separating bodies are located at the connection positions of the outlet passage and the oscillation chamber, respectively. Two feedback channels are located outside two attachment walls. The sudden-expansion micro-nozzle is used to break the viscous shear stress between fluid and the walls and to generate unstable flow and oscillation. Moreover, the two feedback channels have different lengths, inside diameters and alternate outlet positions to further enhance the oscillation of fluid.

16 Claims, 10 Drawing Sheets

MICRO-FLUIDIC OSCILLATOR HAVING A SUDDEN EXPANSION REGION AT THE NOZZLE OUTLET

BACKGROUND OF THE INVENTION

1. Field of the Invention

The present invention relates to a micro-fluidic oscillator and, more particularly, to a micro-fluidic oscillator having a sudden-expansion micro nozzle to conquer fluid viscous force due to increase of instability of fluid so as to generate a self oscillation phenomenon at slow flow.

2. Description of Related Art

A fluidic oscillator makes use of instability of the fluid itself to generate oscillation. Because of restrictions of physical parameters, general fluidic oscillators can only generate oscillation under some flow speeds. If the flow speed is too low, the fluidic oscillators cannot successfully generate oscillation. This will result in much limit in applications, especially in the applications of micro fluidic.

As shown in FIG. 1, U.S. Pat. No. 3,902,367 discloses a fluidic oscillator 2 , which comprises an oscillation chamber 4 with attachment walls 61 and 62 at two sides thereof, a fluid inlet 8, a fluid outlet 10, two feedback channels 12 and 14, and a flow splitter 16. As shown in FIG. 2, U.S. Pat. No. 4,610,162 discloses a fluidic oscillator 18, which comprises an oscillation chamber 20 with attachment walls 221 and 222 at two sides thereof, a fluid inlet 24, a fluid outlet 26, two feedback channels 28 and 30, and a fluid splitter 32. As shown in FIG. 3, U.S. Pat. No. 6,860,157 discloses a fluidic oscillator 34, which comprises an oscillation chamber 36 with attachment walls 381 and 382 at two sides thereof, a fluid inlet 40, a fluid outlet 42, two feedback channels 44 and 46, and two fluid splitters 48.

The above prior art fluidic oscillators 2, 18 and 34 can still successfully operate under ordinary millimeter or micrometer scales to generate oscillation. However, it is found that fluid will move in a mode of stable laminar flow in the micrometer-scaled micro channels of the miniaturized fluidic oscillators 2, 18 and 34 once the fluidic oscillators 2, 18 and 34 are miniaturized with the same ratio. That is, the viscous force of fluid in the micrometer-scaled micro channels will increase substantially so that the micro fluidic will be very stable and can hardly generate oscillation. Therefore, the fluidic oscillators cannot function normally. Although active micro elements can be integrated in the micro channels to perturb the micro fluidic in advance, the fabrication process of the active elements is cumbersome and they are subject to damage.

Accordingly, the present invention aims to propose a more perfect micro-fluidic oscillator to solve the above problems in the prior art.

SUMMARY OF THE INVENTION

An object of the present invention is to provide a micro fluidic oscillator, which has a sudden-expansion micro nozzle and a special design of feedback channels to solve the problem of increased viscous force of fluid in the micro channels in the prior art. Therefore, fluid can still generate oscillation under very slow flow speeds.

To achieve the above object, the present invention provides a micro fluidic oscillator, which comprises a main body and a cover body for covering the main body. The main body comprises an oscillation chamber with two sides composed of two attachment walls, a sudden-expansion micro nozzle, an outlet passage, and two flow splitters. The oscillation chamber is used to provide an oscillation space for a fluid. The sudden-expansion micro-nozzle has a jet stream passage and a sudden-expansion region. One end of the sudden-expansion region is connected with the jet stream passage, and the other end of the sudden-expansion region is connected with one end of the oscillation chamber. The outlet passage is connected with the other end of the oscillation chamber. The two flow splitters are located at connection positions of the outlet passage and the oscillation chamber. The two feedback channels are located at outer sides of the two attachment walls and extended from the two flow splitters to the sudden-expansion region, respectively. The two feedback channels have different lengths or inside diameters, or the outlet positions of the two feedback channels are not completely opposite to each other, or the angle between the two feedback channels and the sudden-expansion region are different.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
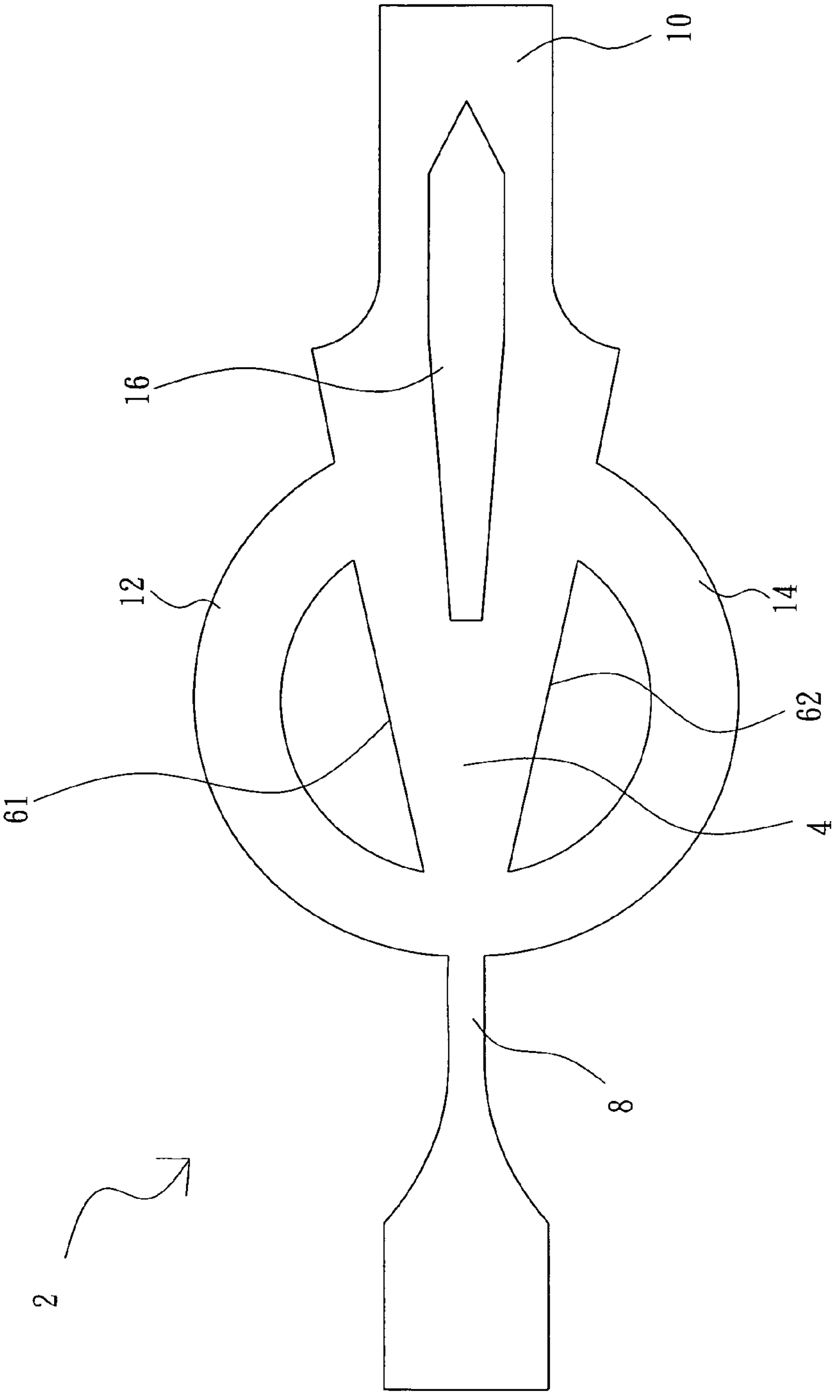
Fig. 1 (prior art)
FIG. 1 is a diagram of a conventional micro-fluidic oscillator.
Figure 2:
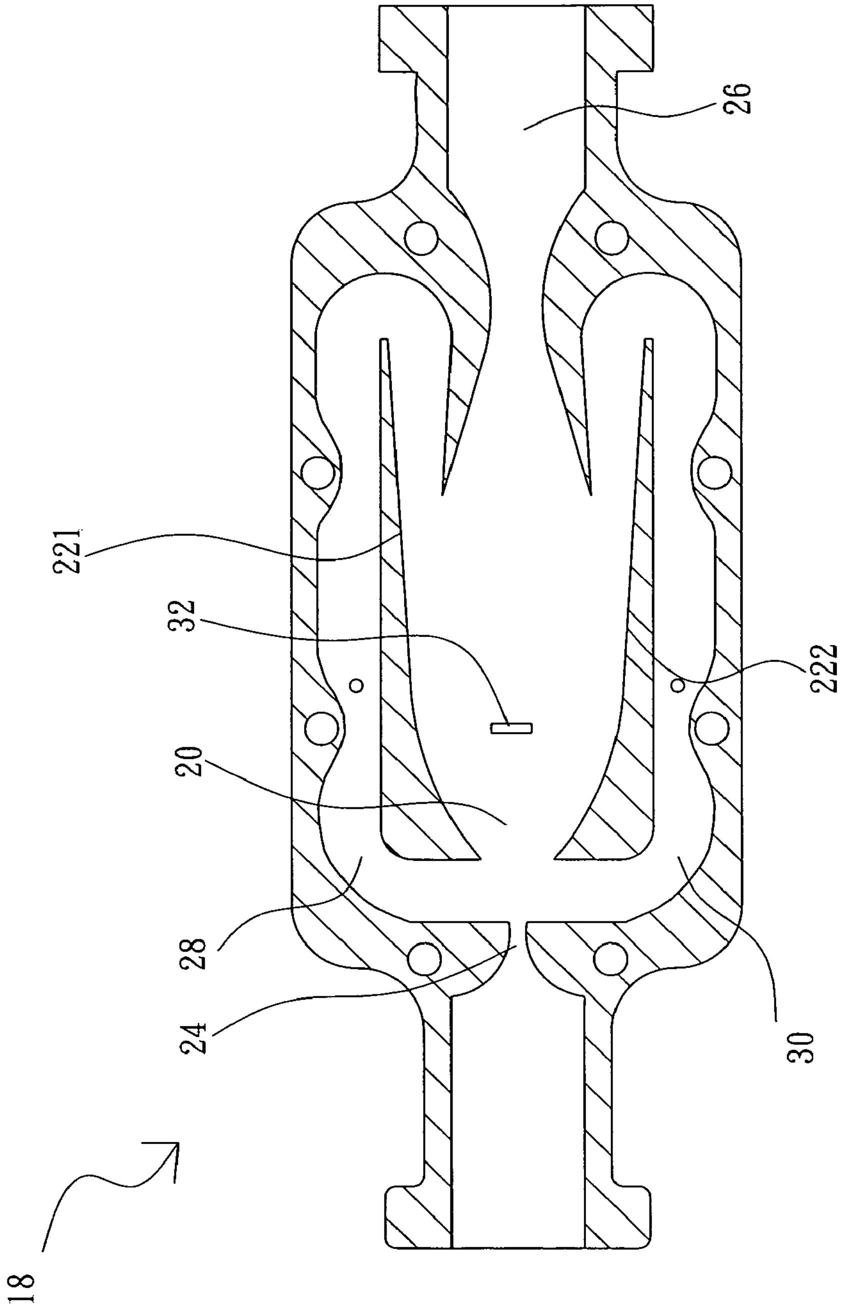
Fig. 2 (prior art)
FIG. 2 is a diagram of another conventional micro-fluidic oscillator.
Figure 3:
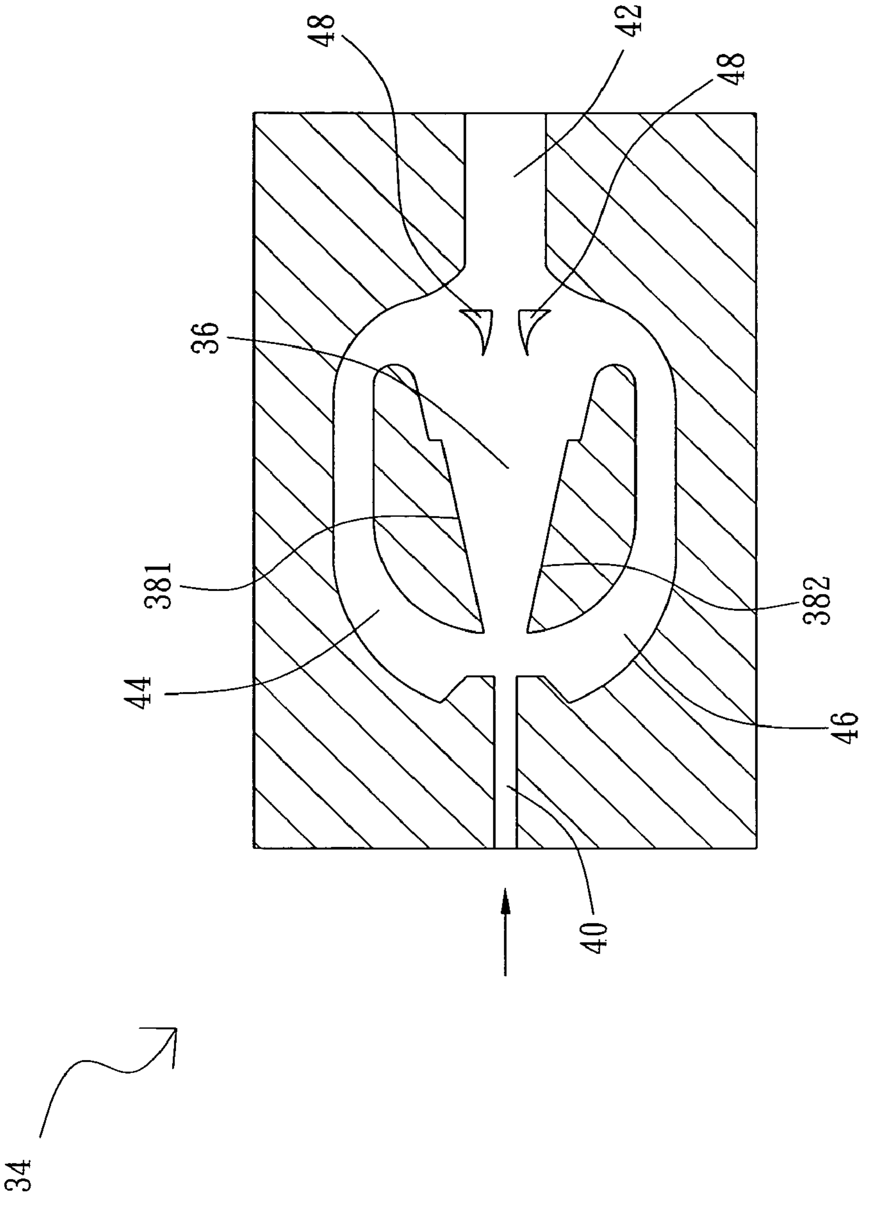
Fig. 3(prior art)
FIG. 3 is a diagram of yet another conventional micro-fluidic oscillator.
Figure 4:
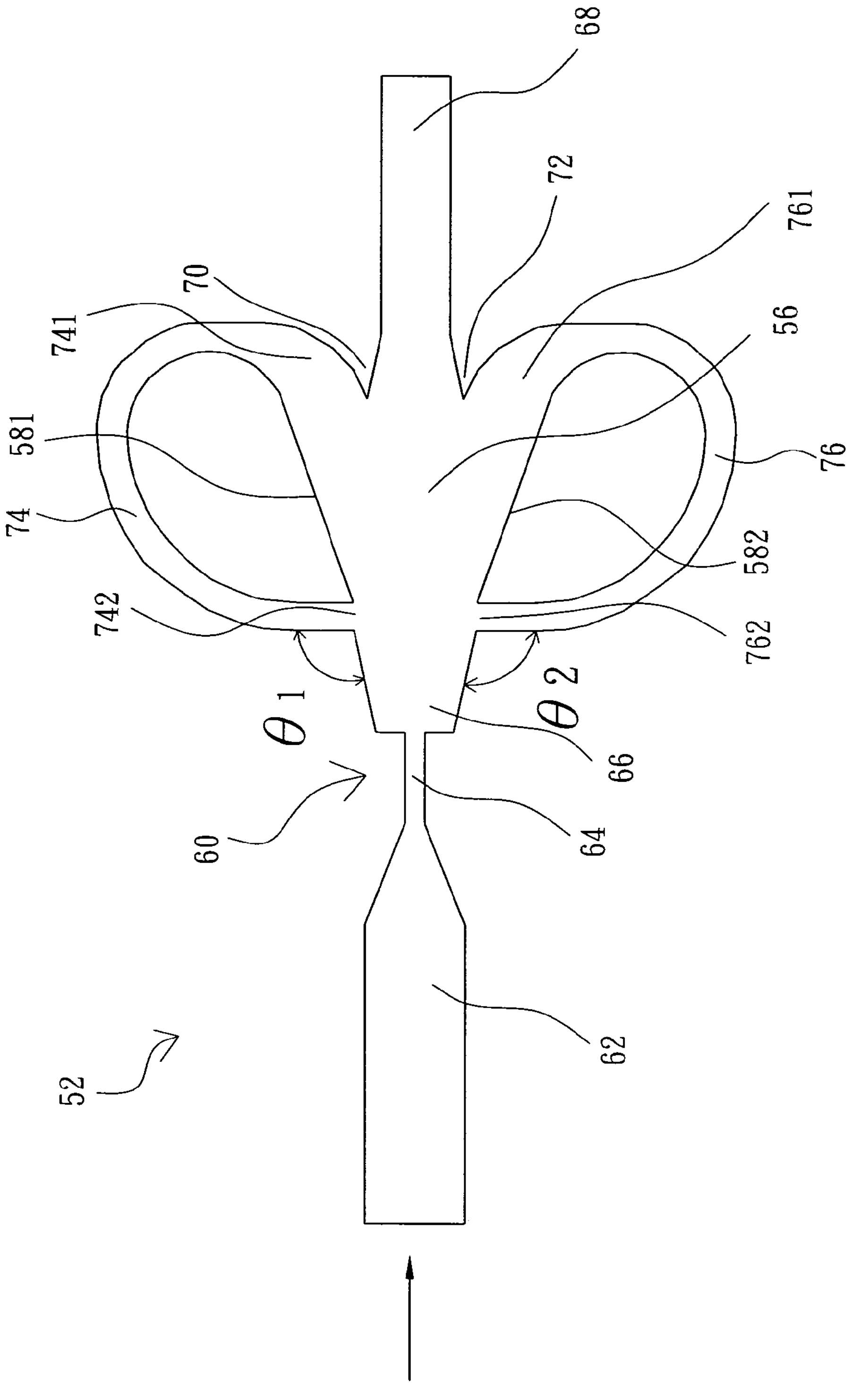
FIG. 4 is a diagram of the micro-fluidic oscillator of the present invention.
Figure 5:
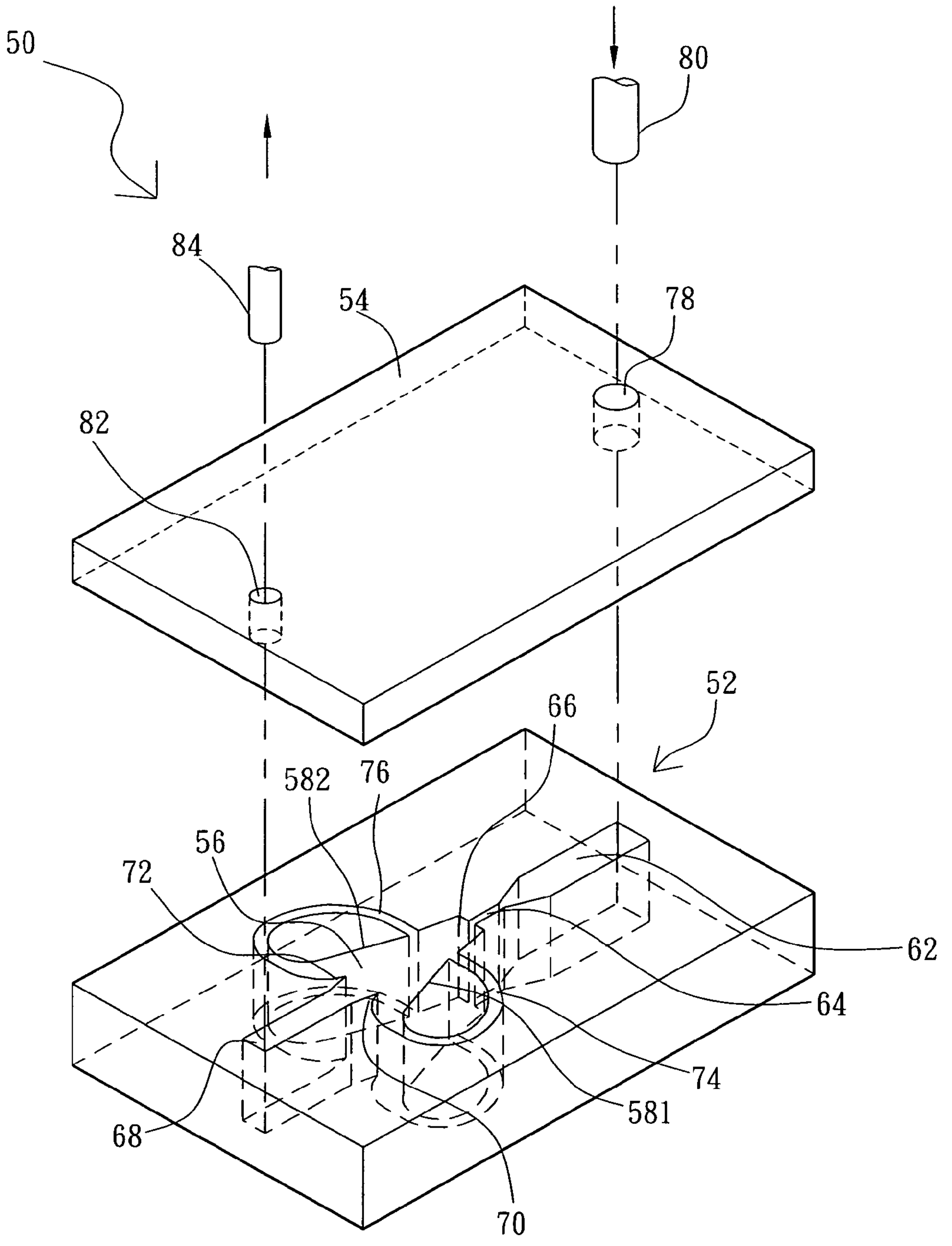
FIG. 5 is a perspective view of the micro-fluidic oscillator of the present invention.
Figure 6B:
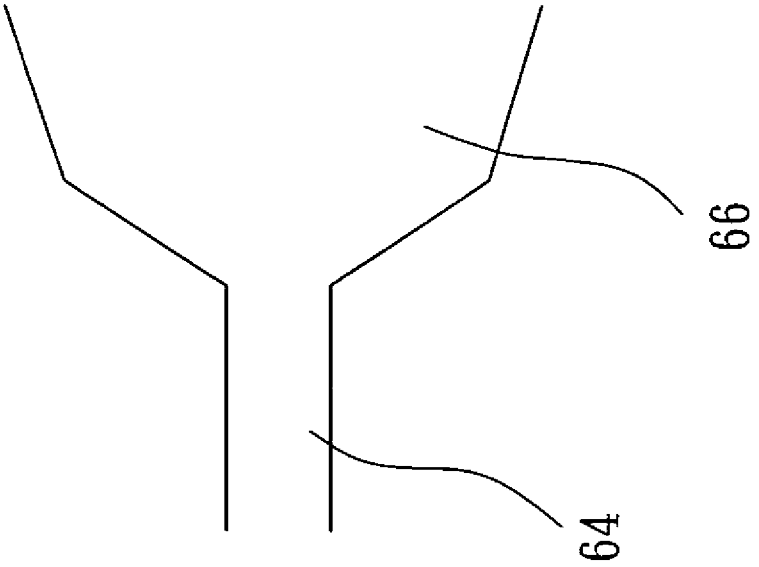
FIG. 6B is a diagram of a sudden-expansion micro-nozzle of a divergent shape of the micro-fluidic oscillator of the present invention.
Figure 6A:
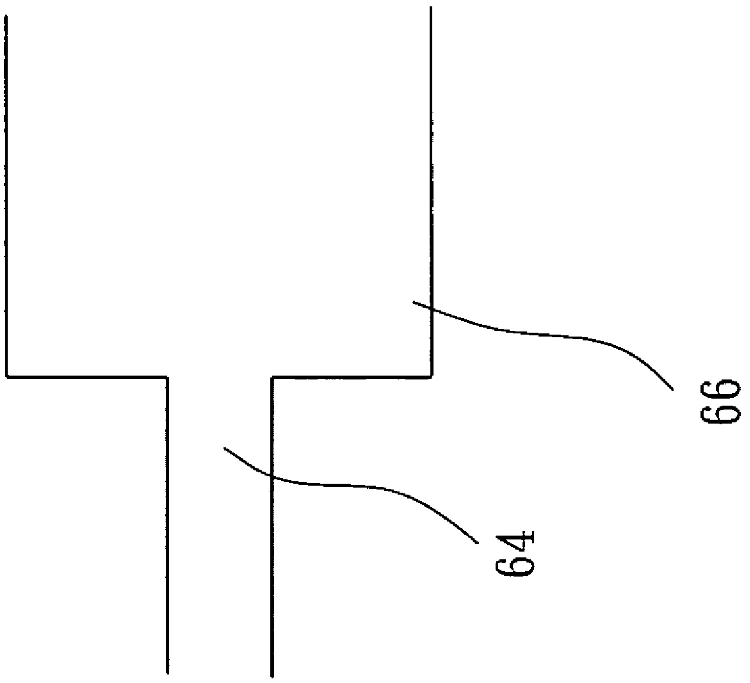
FIG. 6A is a diagram of a sudden-expansion micro-nozzle of a right angle shape of the micro-fluidic oscillator of the present invention.

As shown in FIGS. 4 and 5, a micro fluidic oscillator 50 of the present invention comprises a main body 52 and a cover body 54 for covering the main body 52. The main body 52 comprises an oscillation chamber 56 with two sides formed of two attachment walls 581 and 582, a sudden-expansion micro nozzle 60, an outlet passage 68, two flow splitters 70 and 72, and two feedback channels 74 and 76. The oscillation chamber 56 is used to provide an oscillation space for a fluid. The sudden-expansion micro nozzle 60 has an inlet passage 62, a jet stream passage 64 and a sudden-expansion region 66. One end of the sudden-expansion region 66 is connected with the jet stream passage 64, and the other end of the sudden-expansion region 66 is connected with one end of the oscillation chamber 56. The outlet passage 68 is connected with the other end of the oscillation chamber 56. The two flow splitters 70 and 72 are located at the connection positions of the outlet passage 68 and the oscillation chamber 56. The two feedback channels 74 and 76 are extended from the two flow splitters 70 and 72 to the sudden-expansion region 66, respectively. The sudden-expansion region 66 of the sudden-expansion micro nozzle 60 is of a right angle shape (FIG. 6A) or a divergent shape (FIG. 6B). The depth to width ratio of the jet stream passage 64 of the sudden-expansion micro nozzle 60 is about 2~20. The feedback channels 74 has a feedback channel inlet 741 and a feedback channel outlet 742. The feedback channels 76 also has a feedback channel inlet 761 and a feedback channel outlet 762. The feedback channel inlets 741 and 761 and the outlet passage 68 form the two flow splitters 70 and 72. The feedback channel outlets 742 and 762 are connected with the sudden-expansion region 66.

Moreover, the cover body 54 has an inlet hole 78 corresponding to the inlet passage 62. An inlet duct 80 is inserted into the inlet hole 78 so that the fluid can flow from the inlet duct 80 into the inlet passage 62. The cover body 54 also has an outlet hole 82 corresponding to the outlet passage 68. An outlet duct 84 is inserted into the outlet hole 82 so that the fluid can flow out from the outlet duct 84.

The operation of the micro fluidic oscillation 50 of the present invention is illustrated below. Fluid flows from the inlet duct 80 into the inlet passage 62 the jet stream passage 64, the sudden-expansion region 66 and the oscillation chamber 56, and then hits the flow splitters 70 and 72 so that part of the fluid flows into the outlet passage 68, and part of the fluid flows into the two feedback channel inlets 741 and 761 and then the two feedback channels 74 and 76, and then flows from out the two feedback channel outlets 742 and 762 and finally into the oscillation chamber 56. The above process is repeated to cause instability of the fluid so as to generate oscillation.

Figure 7:
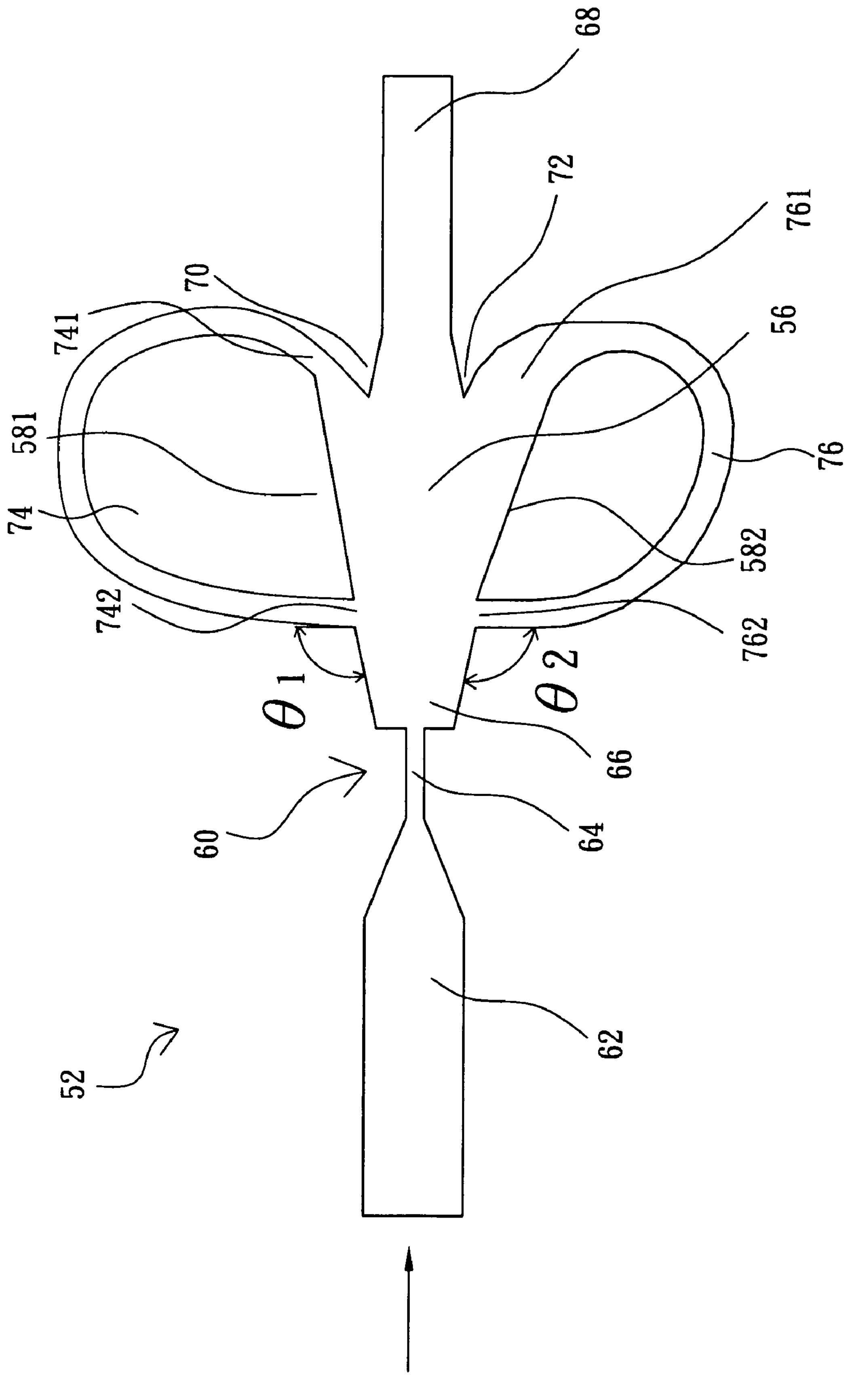
FIG. 7 is a diagram of the micro-fluidic oscillator having two feedback channels with different lengths according to the present invention.
Figure 8:
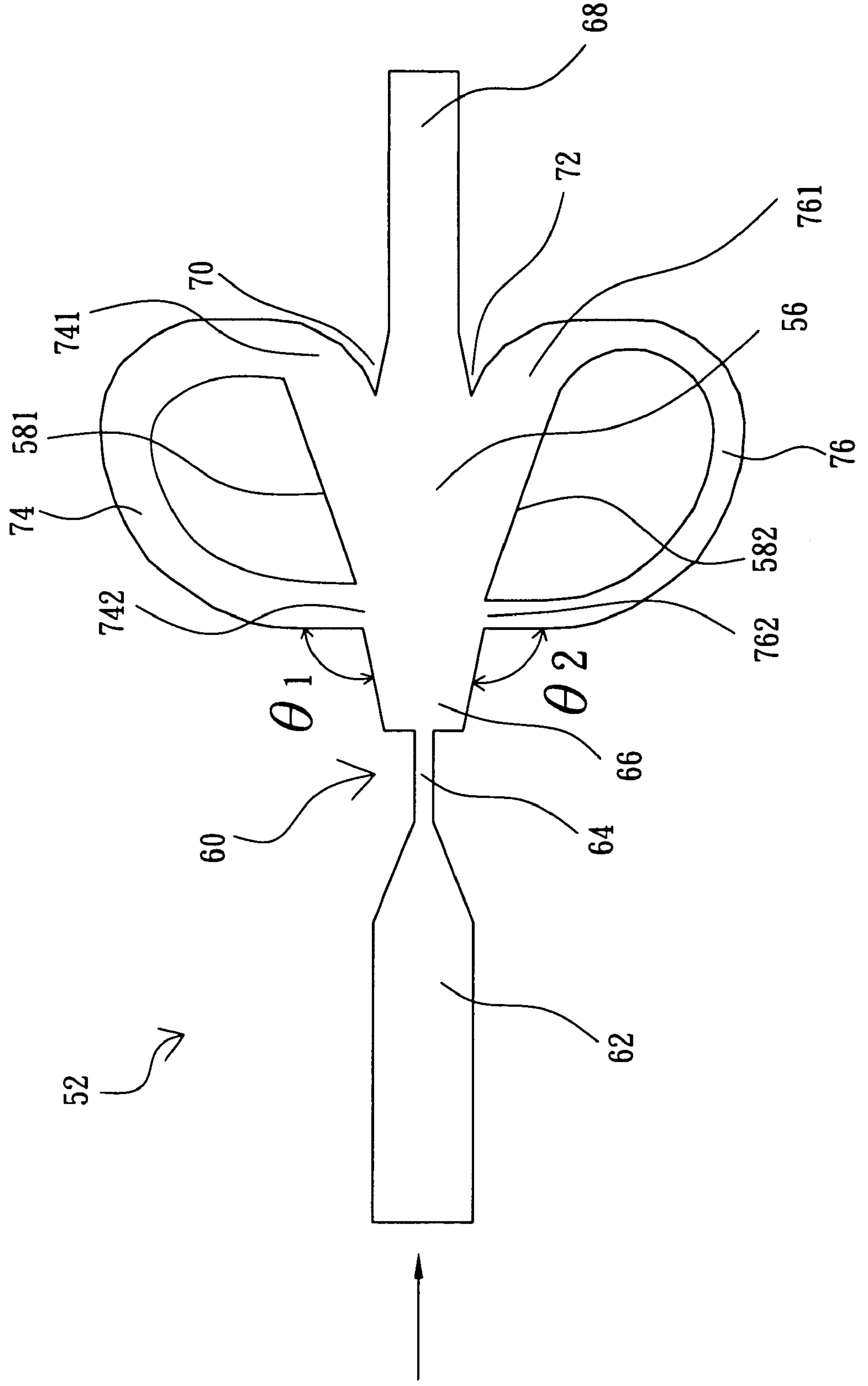
FIG. 8 is a diagram of the micro-fluidic oscillator having two feedback channels with different inside diameters according to the present invention.
Figure 9:
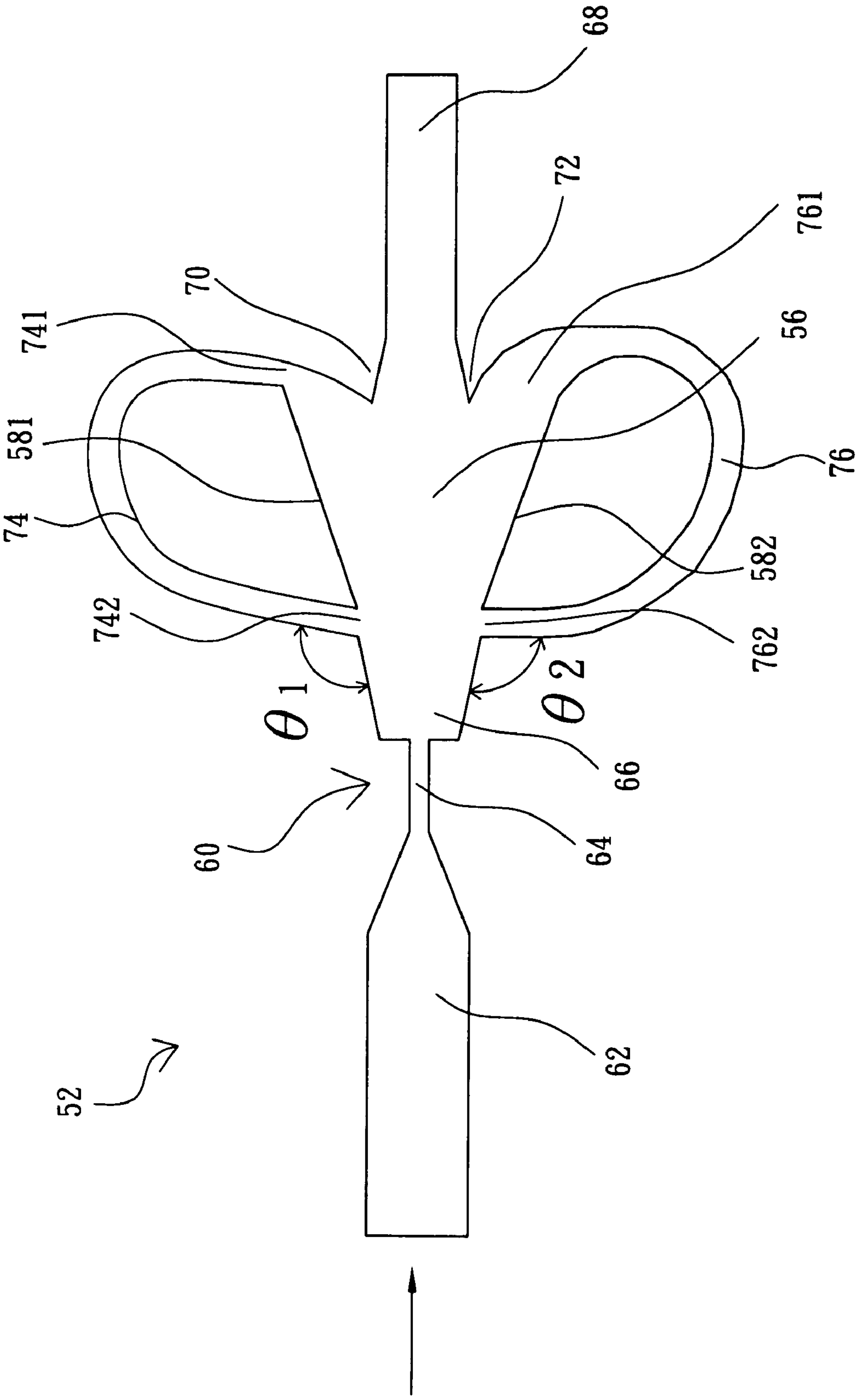
FIG. 9 is a diagram of the micro-fluidic oscillator having two staggered feedback channel outlets according to the present invention.
Figure 10:
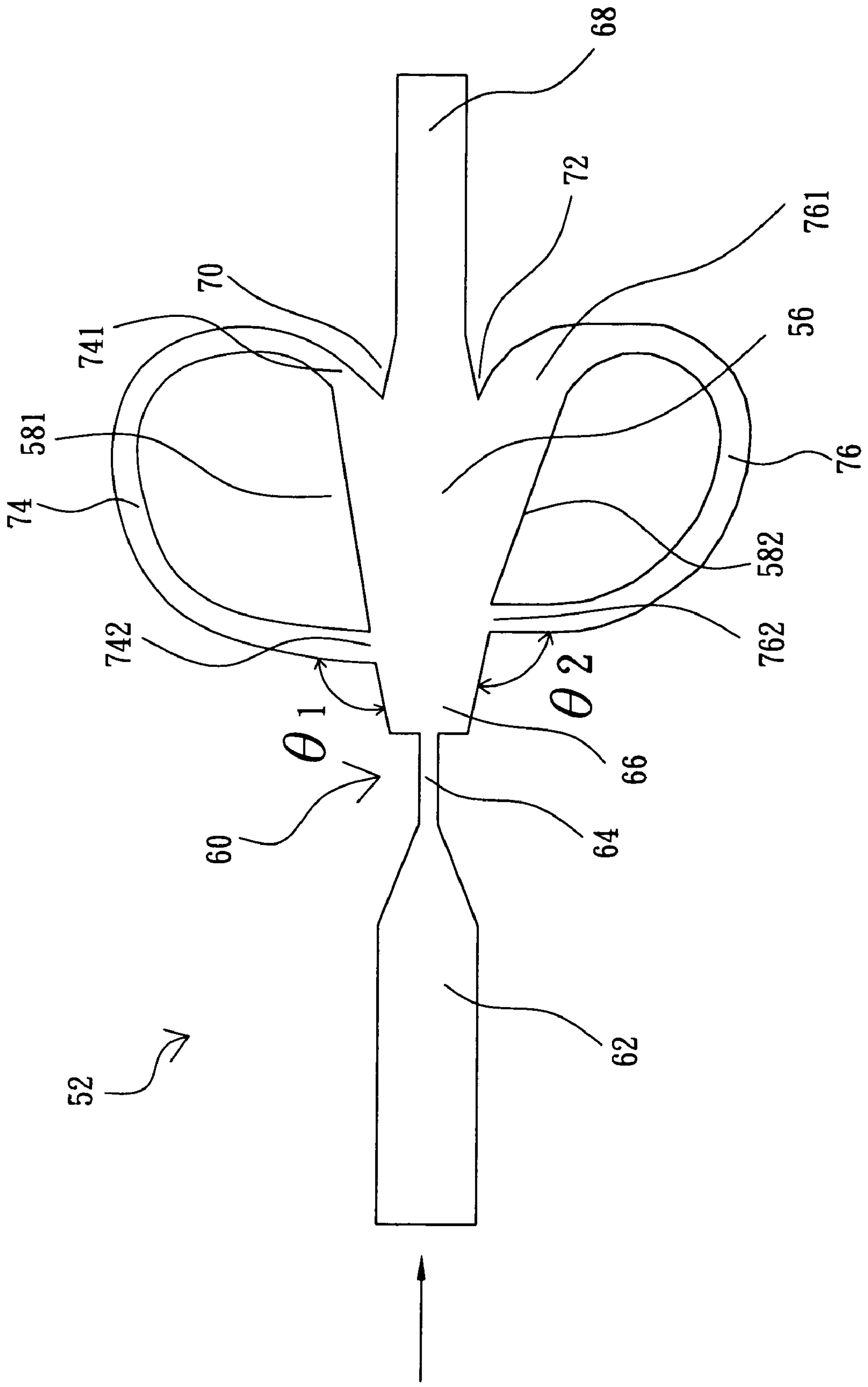
FIG. 10 is a diagram of the micro-fluidic oscillator having two different angels θ1 and θ2 between the sudden-expansion region and the two feedback channels according to the present invention

The lengths of the two feedback channels 74 and 76 can be different, such as FIG. 7. The inside diameters of the two feedback channels 74 and 76 can be defferent, such as FIG. 8. The positions of the feedback channels outlets 742 and 762 can further be staggered and are not totally opposite to each other, such as FIG. 9. The angles $\theta 1$ and $\theta 2$ between the sudden-expansion region 66 and the two feedback channels 74 and 76 can be different, such as FIG. 10. The range of the angles $\theta 1$ and $\theta 2$ are between 30° and 120°. The above design manner can enhance the oscillation driving force and increase the instability of the fluidic oscillation. Even under very low fluid speeds, the fluid can still generate oscillation. The fluid flow rate of the present invention is between 10 micro-liter/min and 100 micro-liter/min.

The material of the main body 52 and the cover body 54 can be selected among silicon, glass, polymer and electroform metal. The main body 52 and the cover body 54 can be joined together by means of glue adhesion or direct application of pressure. If the main body 52 and the cover body 54 are joined together by means of glue adhesion, the joint place of the main body 52 and the cover body 54 should be kept smooth. Or the surfaces of the main body 52 and the cover body 54 to be joined together are processed to produce molecule bonding between them without the need of applying glue or applying pressure to the joint place.

To sum up, the micro fluidic oscillator of the present invention makes use of a sudden-expansion micro nozzle to break the viscous shear stress between fluid and walls so as to generate unstable flow and thus oscillation. Collocated with a special design of two feedback channels, wherein the lengths and inside diameters of the two feedback channels are different, or the outlet positions of the two feedback channels are staggered and are not totally opposite to each other, or the angles between the two feedback channels and the sudden-expansion region are different, the oscillation driving force can be enhanced and the instability of the fluidic oscillation can be increased to keep a self oscillation of the fluid.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A micro-fluidic oscillator comprising:

a main body comprising:

an oscillation chamber with two sides composed of two attachment walls, said oscillation chamber being used to provide an oscillation space for a fluid;

a sudden-expansion micro-nozzle having a jet stream passage and a sudden-expansion region, one end of said sudden-expansion region being connected with said jet stream passage, the other end of said sudden-expansion region being connected with one end of said oscillation chamber;

an outlet passage connected with the other end of said oscillation chamber;

two flow splitters located at connection positions of said outlet passage and said oscillation chamber; and two feedback channels wherein lengths of said two feedback channels are different and located at outer sides of said two attachment walls and extended from said two flow splitters to said sudden-expansion region, respectively; and a cover body for covering said main body.

2. The micro-fluidic oscillator as claimed in claim 1, wherein each of said feedback channels has an inlet and an outlet, said inlets of said feedback channels and said outlet passage form said two flow splitters, and said outlet of each said feedback channel is connected with said sudden-expansion region.

3. The micro-fluidic oscillator as claimed in claim 2, wherein said sudden-expansion micro-nozzle further has an inlet passage, one end of said inlet passage is connected with said jet stream passage so that said fluid can flow from said inlet passage into said jet stream passage and then flow into said sudden-expansion region.

4. The micro-fluidic oscillator as claimed in claim 3, wherein said cover body has an inlet hole corresponding to said inlet passage, and an inlet duct can be inserted into said inlet hole to let said fluid flow from said inlet duct into said inlet passage, said cover body also has an outlet hole corresponding to said outlet passage, and an outlet duct can be inserted into said outlet hole to let said fluid flow out from said outlet duct.

5. The micro-fluidic oscillator as claimed in claim 4, wherein said fluid flows from said inlet duct into said inlet passage, said jet stream passage, said sudden-expansion region and then said oscillation chamber, said fluid then hits said flow splitters so that part of said fluid flows into said outlet passage, and part of said fluid flows into said inlets of said two feedback channels and then said two feedback channels, and then flows from said outlets of said two feedback channels into said sudden-expansion region and finally into said oscillation chamber.

6. The micro-fluidic oscillator as claimed in claim 2, wherein said outlets of said feedback channels are not completely opposite to each other and are staggered.

7. The micro-fluidic oscillator as claimed in claim 1, wherein said sudden-expansion region is of a right-angle shape or a divergent shape.

8. The micro-fluidic oscillator as claimed in claim 1, wherein inside diameters of said two feedback channels are different.

9. The micro-fluidic oscillator as claimed in claim 1, wherein angles between said two feedback channels and said sudden-expansion region are different.

10. The micro-fluidic oscillator as claimed in claim 1, wherein angles between said two feedback channels and said sudden-expansion region are between 30°~120°.

11. The micro-fluidic oscillator as claimed in claim 1, wherein a depth to width ratio of said jet stream passage is between 2 and 20.

12. The micro-fluidic oscillator as claimed in claim 1, wherein the flow rate of said fluid is between 10 micro-liter/min and 100 micro-liter/min.

13. The micro-fluidic oscillator as claimed in claim 1, wherein material of said main body is silicon or glass.

14. The micro-fluidic oscillator as claimed in claim 1, wherein material of said cover body is silicon or glass.

15. The micro-fluidic oscillator as claimed in claim 1, wherein material of said main body is polymer or electroformed metal.

16. The micro-fluidic oscillator as claimed in claim 1, wherein material of said cover body is polymer or electroformed metal. or electroformed metal.

* * * * *

UNITED STATES PATENT AND TRADEMARK OFFICE

CERTIFICATE OF CORRECTION

PATENT NO. : 7,481,119 B2

APPLICATION NO. : 11/603030

DATED : January 27, 2009

INVENTOR(S) : Jing-Tang Yang, Chi-Ko Chen and Kun-Chih Tsai

It is certified that error appears in the above-identified patent and that said Letters Patent is hereby corrected as shown below:

Please amend the Title Page Block [75] as follows:

Delete the first inventor name “Jung-Tang Yang” and insert the corrected spelling --Jing-Tang Yang--

Signed and Sealed this

Eighteenth Day of August, 2009

David J. Kappos

*Director of the United States Patent and Trademark Office*